W. FISHER.
INTERNAL COMBUSTION ENGINE.
APPLICATION FILED APR. 8, 1922.

1,428,376.

Patented Sept. 5, 1922.
4 SHEETS—SHEET 3.

Inventor
William Fisher
by
Attorney.

W. FISHER.
INTERNAL COMBUSTION ENGINE.
APPLICATION FILED APR. 8, 1922.

1,428,376.

Patented Sept. 5, 1922.
4 SHEETS—SHEET 4.

Inventor
William Fisher
by
W. E. Evans
Attorney.

Patented Sept. 5, 1922.

1,428,376

UNITED STATES PATENT OFFICE.

WILLIAM FISHER, OF NORTH TAWTON, ENGLAND.

INTERNAL-COMBUSTION ENGINE.

Application filed April 8, 1922. Serial No. 550,729.

*To all whom it may concern:*

Be it known that I, WILLIAM FISHER, a subject of the King of Great Britain and Ireland, residing at North Tawton, Devonshire, England, have invented certain new and useful Improvements Relating to Internal-Combustion Engines, of which the following is a specification.

This invention relates to internal combustion engines more especially applicable for use on motor vehicles.

The invention has for its object to provide an effective construction of internal combustion engine adapted to operate as a two stage or compound engine.

According to the invention the engine comprises co-axial high and low pressure cylinders with pistons mounted upon a common piston rod, communication between the said cylinders being controlled by a co-axial disc valve disposed between them the construction and organization being such that the larger low pressure cylinder will serve as an air compressor, during one of the cycles of the engine and stored for subsequent use.

The disk valve is located between the high and low pressure cylinders, the adjacent connected heads having registering ports, a central opening for the piston rod and water chambers for cooling the cylinders and the disk valve that may be advantageously operated from its periphery and in the case of a multicylinder engine the respective disk valves may be directly or indirectly geared.

According to the invention, the disk valve serves for the admission of the waste gases from the high pressure or main motor cylinder to the low pressure cylinder in which their residual pressure is utilized, the valve serving at the same time to control the exhaust of the gases from the said second cylinder after their expansion therein.

According to the invention, the low pressure motor cylinder is capable of use for the purpose of drawing in a charge of air and of compressing this charge of air in the two strokes of the engine piston intermediate of the strokes corresponding to exhaust and suction strokes in the high pressure or main motor cylinder.

According to the invention, means are provided for the alternate use of the low pressure motor cylinder as a compressed air motor. For this purpose a tank is provided for the reception of the charges of air compressed in the normal operation of the piston in the low pressure cylinder, and a rotating valve device is provided capable of being set into operation by means of a clutch operable from the seat of the driver of the vehicle to which it is applied, so that charges of compressed air may be admitted in succession to the low pressure cylinder for the purpose of starting up or as an auxiliary when required.

The invention comprises the features which are hereinafter described in the construction and use of a motor according to the invention.

An internal combustion engine provided according to the invention is illustrated by way of example in the accompanying diagrammatic drawings in which Figure 1 is a transverse sectional elevation.

Figure 1:
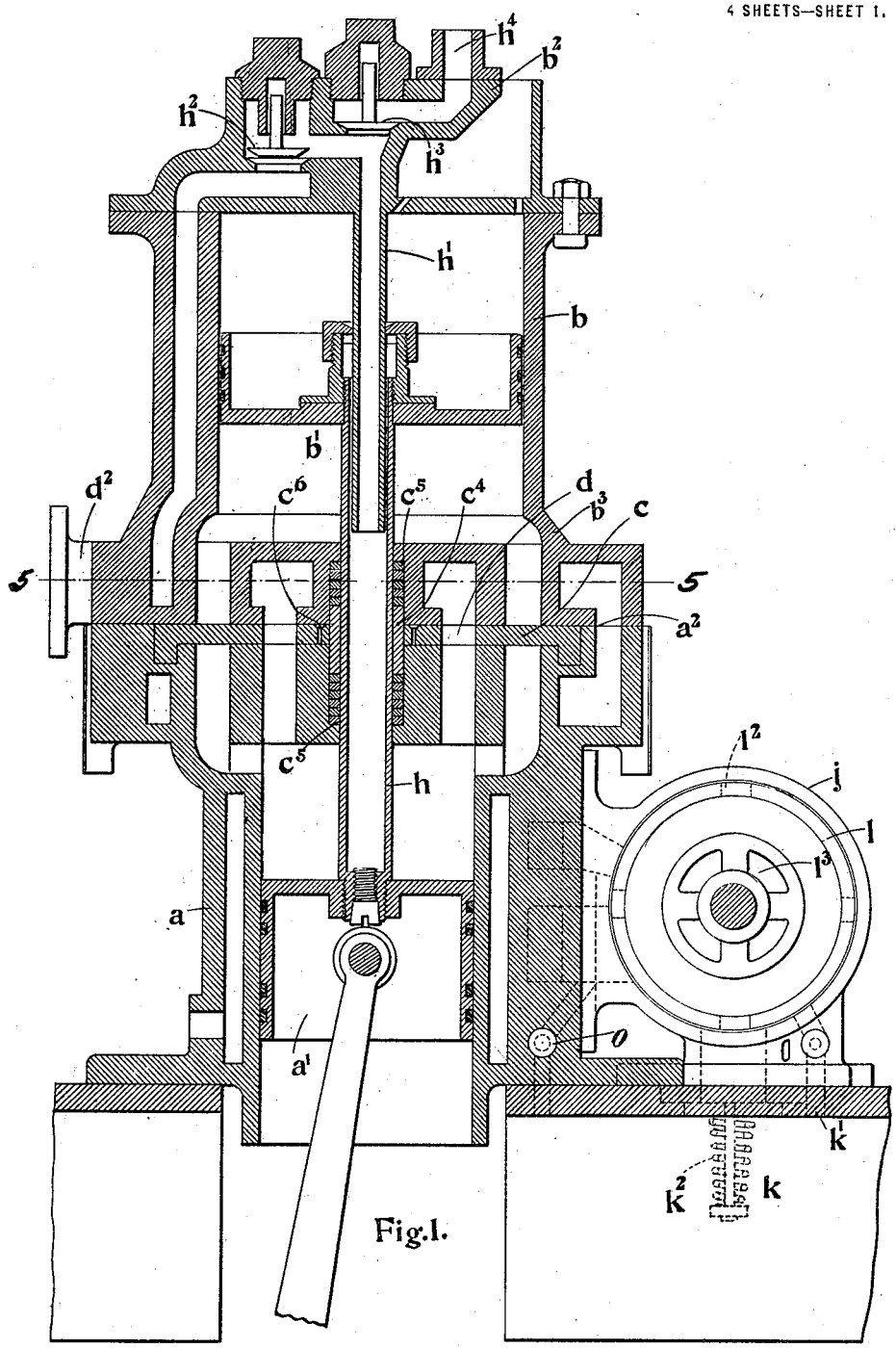

In carrying the invention into effect according to the construction represented in the drawings in its application to an internal combustion engine having two alined cylinders $a$, $b$, one above the other, the main or high pressure motor cylinder $a$ is advantageously positioned above in front of the upper motor or low pressure cylinder $b$. The low or high pressure motor cylinder $a$ operates as a four-stroke internal combustion engine while the low pressure cylinder $b$ in normal operation serves alternately as a two-stroke expansion engine in the utilization of the products of combustion from the high pressure cylinder $a$ and alternately as a pump for air. Between the two cylinders there is rotatably maintained disc valve $c$ which has therethrough four ports, the inner ports $d$ opening communication with suction ways, the two suction ports $d$ being disposed in diametrically opposite positions and the same distance from the center and concentric with the axis of the disc valve to control the suction ports $d^1$ the other two larger ports $e$ being diametrically opposite each other and concentric, said ports $e$ being nearer the margin of the disk to aline with and control the other passages, $f$, $f^1$, $g$, $g^1$, which serve respectively for the passage of the expanding gases from the cylinder $a$ to the cylinder $b$, also for the exhaust of the gases from the cylinder $b$, the passage of air to the cylinder $b$ and the exhaust of the air from the cylinder $b$, these larger ports $e$ coming into position over these passages $f$, $f^1$, $g$, $g^1$ once in every half revolution of the disc valve $c$.

Figure 2:
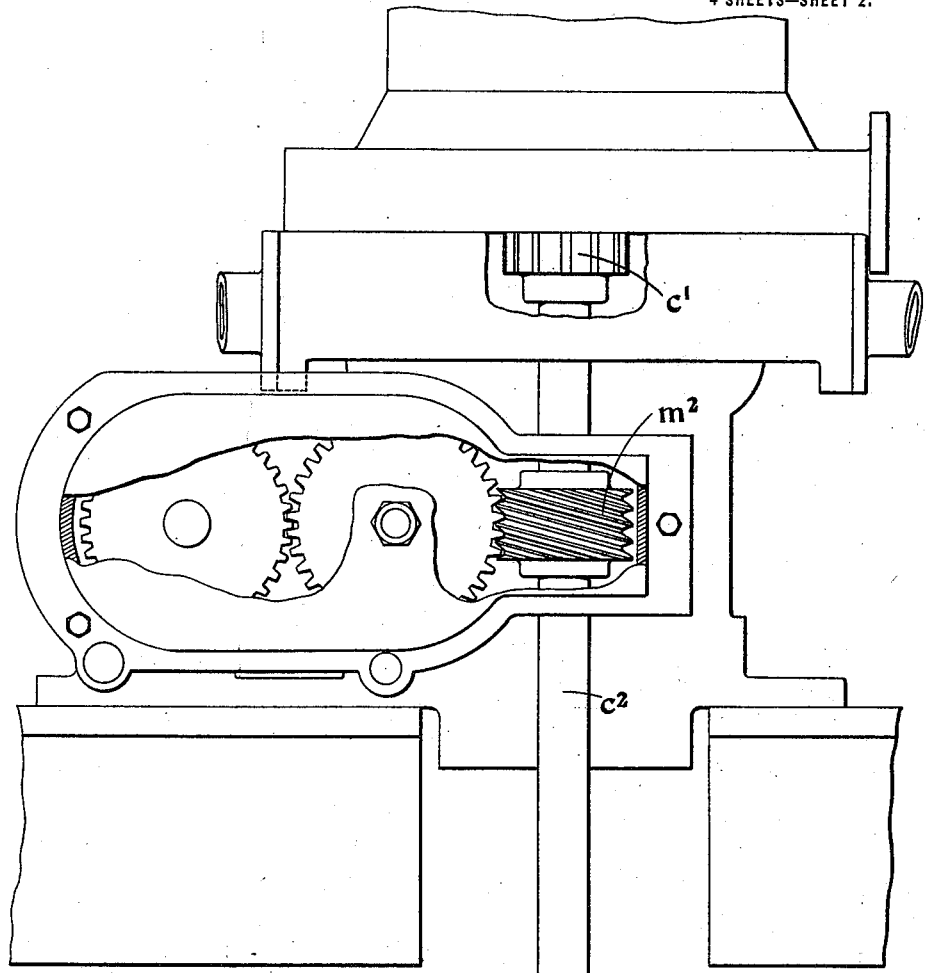
Figure 2 is a partial side elevation viewed from the opposite side of Figure 1 partly in section.
Figure 2:
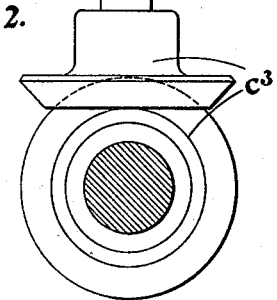

The peripheral edge of the disc valve is provided with teeth for its operation by suitable gear from the crank shaft of the engine, the gear ratio being such that the disc valve rotates once in every four revolutions of the crank shaft. As shown in Figure 2 of the drawings, the gear may comprise a gear wheel $c^1$ carried upon a vertically disposed valve shaft $c^2$, rotated through bevel gear $c^3$ from the main shaft.

The connected and abutting cylinder heads which the disc valve is mounted to serve for both the cylinders $a$ and $b$ and is formed of two parts which are divided in a plane corresponding to that of the disc valve and such heads may be integral with the respective cylinders. As shown in Figure 1, the valve seating may be formed entirely in the top face of the lower part of the cylinder head. At the centre the disc valve $c$ is provided with a hole of a diameter to fit around a sleeve $c^4$ adapted to be received in a bore in the cylinder head of sufficient length to permit the introduction of expanding and contracting packing rings $c^5$ above and below the sleeve $c^4$. Through the sleeve $c^4$ and the packing rings $c^5$ the tubular piston rod $h$ passes, extending upwardly from the piston $a^1$ of the smaller cylinder $a$ and being connected at its opposite end to the piston $b^1$ of the larger cylinder $b$.

The respective parts of the cylinder head are separately water jacketed and their water jackets may be connected in series with the water jackets of the respective cylinders and the jointing faces are so provided as to ensure a perfectly water-tight joint being made at the point $a^2$ between the respective parts of the cylinder head.

Figure 5:
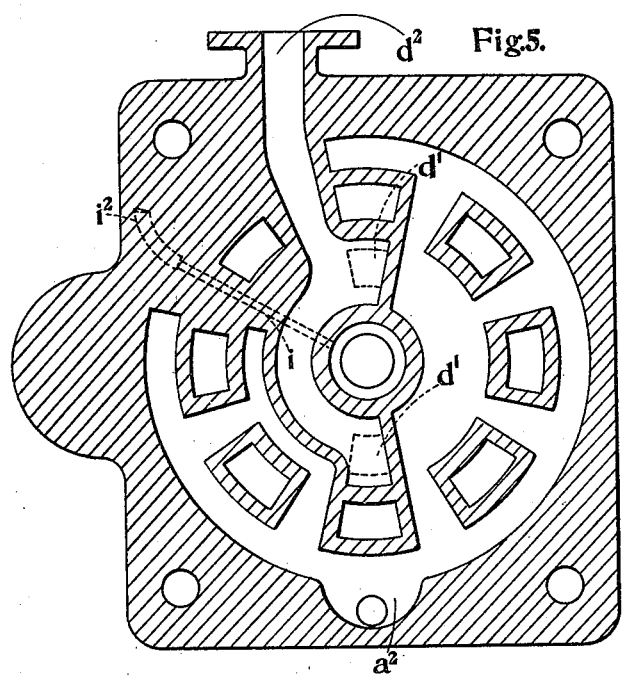
Figure 5 is a sectional plan view of the upper cylinder taken on the line 5—5 of Figure 1.

Means are provided for the passage of lubricant to the respective faces of the disc valve in contact with the under face and upper face of the respective parts of the cylinder heads, and to the sleeve aforesaid, and for this purpose, see Figures 1 and 5, there may be provided an annular groove $c^6$ in the upper face of the disc valve immediately around the central opening and a series of small passages or bores may lead from the said groove through the disc to the lower face. The lubricant may be supplied to the groove by way of an oil passage $i$ formed in the upper part of the cylinder head and connected to a pipe or tube $i^2$ leading from a supply tank, circulating pump or the like.

The respective segmental ports $d$, $e$ provided in the disc valve are so set in relation to the passages $d^1$ $f$ $f^1$ $g$ $g^1$ provided in the cylinder head that the following cycle of operations may take place:—

Figure 3:
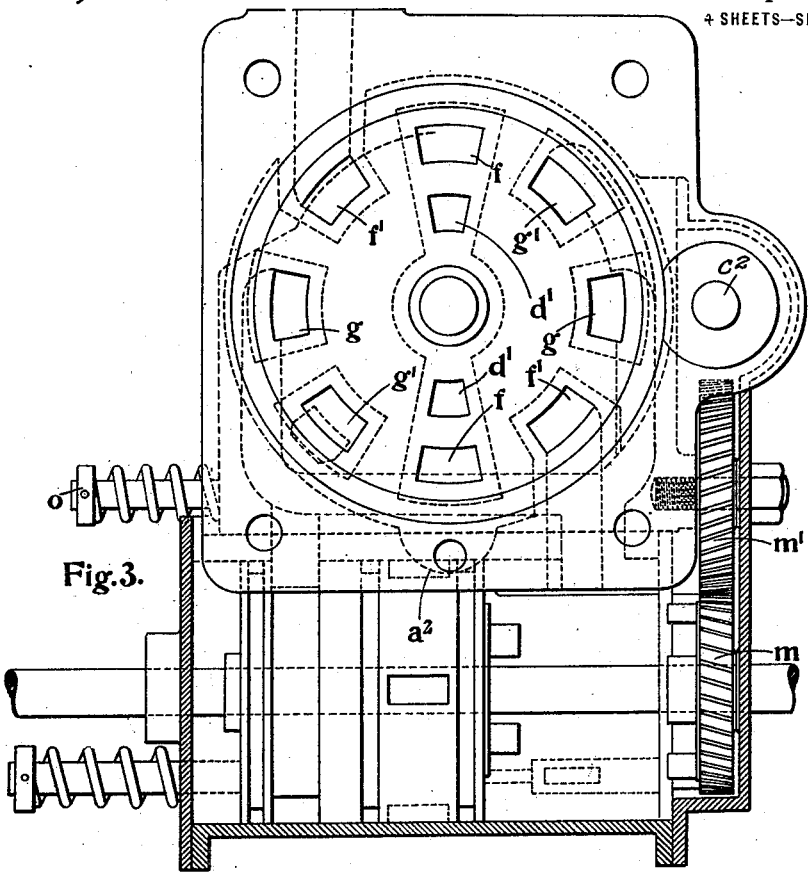
Figure 3 is a plan view showing the seat of the rotatable disc valve at the head of the lower cylinder and the rotatable air valve.
Figure 4:
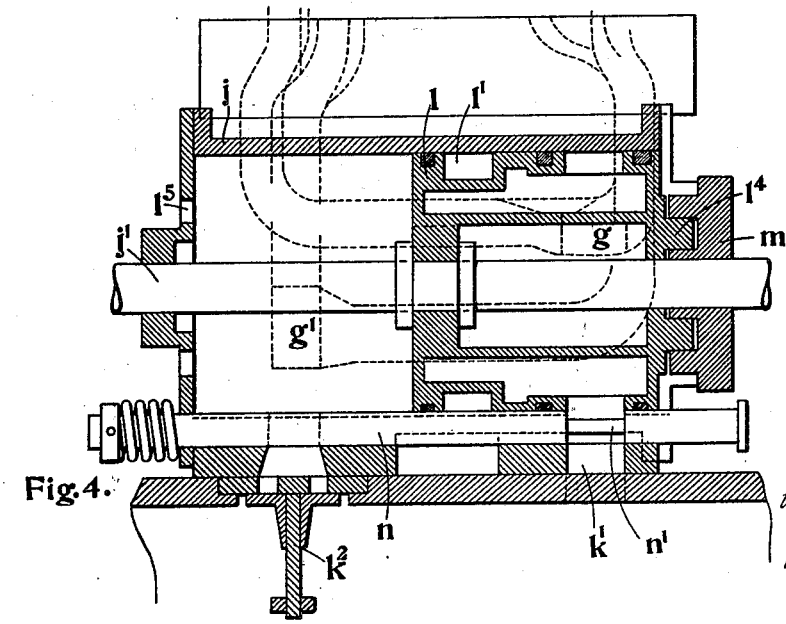
Figure 4 is a sectional elevation through the rotatable air valve and its casing.
Figure 6:
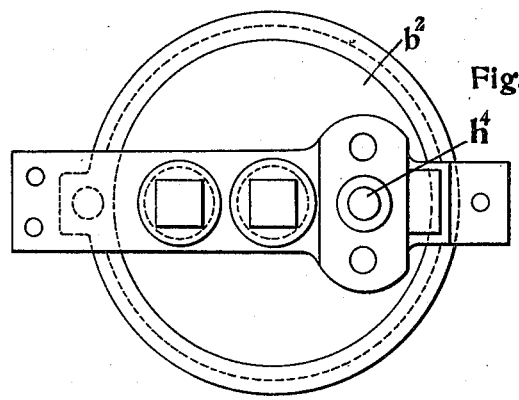
Figure 6 is a plan view of the top portion of the upper cylinder.

On the suction stroke in the cylinder $a$, the inlet passages $d^1$ in the lower part of the cylinder head which lead to the cylinder are placed in communication through the valve ports $d$ with the corresponding inlet passages $d^1$ in the upper part of the cylinder head which connect to the supply passage $d^2$ provided in the upper part of the cylinder head with a lateral inlet. An explosive charge is then admitted and the rotating disc valve $c$ closes the passages at the end of the same stroke. On the return compression stroke and the succeeding explosion stroke in the cylinder $a$ all passages remained closed. On the following exhaust stroke the exhaust passages $f$ extending in line through the respective parts of the cylinder head are opened by the disk valve so that the exhaust gases pass directly through the ways to the cylinder $b$ and these exhaust passages are closed at the end of the exhaust stroke. The cycle then recommences in the first cylinder but on the further movement of the disc valve into the position that it assumes at the commencement of the suction stroke of the piston in the cylinder $a$, the exhaust passages $f^1$ from the cylinder $b$ are opened by the ports $e$ of the disc valve, the exhaust passing through the upper part of the cylinder head, through the valve ports in the disk, and laterally outwards at $f^2$ through the lower part of the cylinder head. Thus the exhaust from the cylinder $b$ takes place simultaneously with the suction stroke in the cylinder $a$. On the compression stroke in the cylinder $a$ the disc valve $c$ opens communication through the ports $e$ between the respective ports of air inlet passages $g$ and the cylinder $b$ so that air is drawn into the said cylinder. On the succeeding explosion stroke in the cylinder $a$ the air previously drawn into the cylinder $b$ passes through air outlet passages $g^1$, see Figures 3 and 4, in the lower part of the cylinder head through which communication is opened by the ports $e$ of the disc valve. The air is thus expelled and may be led to a reservoir for storage or be otherwise utilized.

On the succeeding exhaust stroke of the cylinder $a$ the same cycle of operations is completed as hereinbefore described.

In the construction of engine illustrated in the drawings the air inlet passages $g$ and the air outlet passages $g^1$ are connected to the casing $j$ of a rotary and slidable controlling valve and the arrangement is such that the cylinder $b$ may be used as the cylinder of a compressed air engine in the manner hereinafter described.

It will be understood that the respective inlet and outlet passages provided in the cylinder head as hereinbefore described are so formed and provided that perfect gas tight joints are formed in the plane of the respective meeting faces of the two parts of the cylinder head.

Means may be provided to close the outlet pipes whereby when the engine is applied on a motor vehicle a brake may thus be applied upon the engine.

The tubular piston rod $h$ may co-operate with another stationary piston rod $h^1$ carried by upper cylinder head $b^2$ of the cylinder $b$ for the purpose of pumping water into the water jackets in the manner hereinbefore described. It will be understood that the down stroke of the tubular piston rod $h$ creates an enlarged space into which the water passes under atmospheric pressure or gravity and on the succeeding stroke the water admitted is forced into the water circuit. In the construction illustrated the water is drawn through the jackets and through a non-return valve $h^2$ and expelled by the non-return valve $h^3$ and the outlet $h^4$ whence it may pass to a radiator.

As hereinbefore stated, the cylinder $b$ may be used as a compressed air engine and for this purpose the air inlet and exhaust passages $g$, $g^1$ are connected to a cylindrical valve casing $j$ at determined positions as to its length, while the casing also communicates at corresponding longitudinal positions through ports with a compressed air receptacle $k$. Within the casing $j$ is disposed a cylindrical valve $l$ carried upon a shaft $j^1$ in such manner as to be rotatable thereon while being constrained from relative longitudinal movement. An annular groove or channel $l^1$ is formed around the periphery towards the rearward end, while towards the forward end a series of ports $l^2$, for example, four in number, are provided, the relationship of the ports $l^2$ and groove $l^1$ being determined for the purpose hereinafter described. The rear end is also provided with ports $l^3$ permitting communication through the valve in the direction of the axis. At the forward end the valve carries a series of clutch teeth $l^4$ adapted to co-operate with corresponding teeth upon a co-axial wheel $m$ rotated by an idle wheel $m^1$ from a worm $m^2$ on the shaft $c^2$, the ratio being such that the wheel $m$ makes one revolution to eight of the main shaft. The rearward end of the valve casing is closed by a plate having ports $l^5$. The shaft $j^1$ is connected to an operating lever by which the valve may be adjusted in position in the casing or moved forward to engage the clutch $m$. A rod $n$ carried in bearings provided on the valve casing has a reduced portion $n^1$ to co-operate with a port $k^1$ connecting the reservoir $k$ with the valve casing $j$, the port being closed by the rod $n$ under the action of a spring.

An operating lever for the shaft $j^1$ is provided and its relation to the rod $n$ is such that as the shaft is moved into position to effect engagement of the valve $l$ with the gear $m$ it also serves to effect a movement of the rod $n$ to open the port $k^1$ for the passage of air from the reservoir $k$ to the valve casing $j$. The valve $l$ being rotated by the clutch and gear wheel $m$, the air passes from the port $k^1$ through the ports $l^2$, in succession, into the outer annular chamber of the valve and thence to the air passages $g$ by way of the ports $l^2$ as they successively register with the port of the air passages $g$. The air is thus led to the cylinder $b$ and drawn in or expanded on the in-stroke of the piston. On the succeeding out stroke the air passes out to the atmosphere by the passages $g^1$ which are uncovered by the valve ports $e$, by way of the valve casing $j$.

When the valve operating lever is moved in a direction to a position the valve $l$ between the ports of the air passages $g$ and $g^1$, the rod $n$ by expansion of the spring is returned to its initial position, closing the port $k^1$, and shutting off the supply of compressed air. Air now passes from the atmosphere by way of the ports $l^5$, $l^3$ and centrally through the valve $l$ to the air passages $g$ and the cylinder $b$ on the instroke of its piston, and from the cylinder by way of the passages $g^1$ and ports $l^5$ to the atmosphere on the succeeding outstroke of the piston. On the next rearward movement of the valve operating lever the valve $l$ is positioned with the annular groove or channel $l^1$ registering with the port of the air passages $g^1$ and the inlet port of the valve $k^2$ of the air reservoir $k$. On the instroke of the piston in the cylinder $b$ air is drawn in as before, but on the outstroke the air is forced through the air passages $g^1$ and the groove or channel $l^1$ past the valve $k^2$ into the reservoir $k$.

In the rearmost position of the valve operating lever the middle portion of the periphery of the valve casing $j$ closes the port of the air passages $g^1$ so that on the outstroke of the piston in the cylinder $b$ the air is trapped and compressed and acts as a brake upon the engine.

A valve rod $o$ similar to the valve rod $n$, is advantageously provided to open direct communication between the reservoir $k$ and the cylinder $b$ by way of the main air channels and such valve rod may be controlled by a pedal. By such means air may be admitted from the reservoir to the cylinder $b$ for starting purposes.

Figure 7:
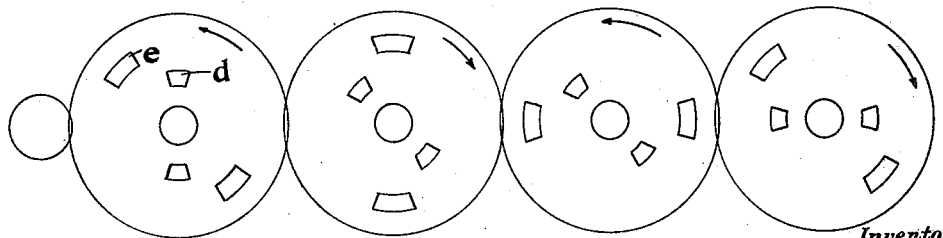
Figure 7 is a diagrammatic representation of the disposition of the disc valves in an internal combustion engine having four cylinders.

In the use of the invention in connection with multi-cylinder engines the disc valves may be driven from a single gear as indicated in Figure 7, the respective valves transmitting movement one to the other and being set in accordance with the cycle of operations in the respective cylinders.

A single valve casing $j$ and shaft $j^1$ may serve for all the cylinders, the respective valves $l$ being disposed in determined positions upon the shaft as required for co-operation with the ports of the respective cylinders.

I claim:

1. The combination in an internal combustion engine, of high pressure cylinder, a low pressure and compression cylinder in coaxial relation to each other, a piston head for each cylinder, a common piston rod connected to each of the piston heads, a structure between the cylinders constituting a part of adjacent and connected heads of the cylinders, said structure also having inlet and outlet passages, a series of circumferential ports arranged to communicate with both cylinders, an air inlet passage which communicates with ports between the piston rod and the circumferential ports, a disk valve rotatably mounted in the structure and having four ports therethrough, two of said ports being positioned to aline with the ports with which the air inlet communicates, the other two ports of the disk being alined to one side both diametrically and circumferentially of the first mentioned ports and adapted to successively register with the circumferential ports, the parts being organized and actuated so that during a semi-rotation of the disk valve the high pressure cylinder operates as a four cycle engine and the lower pressure cylinder as a two stroke engine, and during the other half of the rotation of the disk valve as an air compressor.

2. The combination in an internal combustion engine, of two cylinders, one constituting a high pressure cylinder and the other a combined low pressure and air compressing cylinder, pistons for said cylinders, a piston rod common to both of the pistons, a structure comprising adjacent and connected cylinder heads which has therethrough a central passage for the piston rod, an air inlet passage, a pair of oppositely positioned ports which are spaced at equal distance from the center of the heads and communicate with the cylinders, a series of four ports arranged to one side of the diametric center of the structure, said ports being equally spaced and appropriately connected with inlet and exhaust passages, a similar series of four ports on the opposite side of the structure from the aforesaid four ports, passages for establishing communication between the circumferential series of ports and an air reservoir, a rotary disk valve seated in the structure the same having a pair of diametrically opposite ports therethrough which are in circumferential alinement to register with the ports of the air inlet passage, and with a pair of diametrically opposite ports positioned diametrically opposite each other and out of line both diametrically and circumferentially with the inner ports, to establish communication between the high and low pressure cylinder, means for rotating the disk valve, the parts being organized so that upon a half rotation of the valve the low pressure cylinder will operate as a two cycle engine and on the other half rotation the low pressure cylinder may serve as an air compressor.

WILLIAM FISHER.